(12) United States Patent
Saito

(10) Patent No.: US 6,943,137 B2
(45) Date of Patent: Sep. 13, 2005

(54) SLIDING MEMBER

(75) Inventor: Mika Saito, Niigata-ken (JP)

(73) Assignee: Kabushiki Kaisha Riken, Tokyo (JP)

( * ) Notice: Subject to any disclaimer, the term of this patent is extended or adjusted under 35 U.S.C. 154(b) by 122 days.

(21) Appl. No.: 10/322,761

(22) Filed: Dec. 19, 2002

(65) Prior Publication Data

US 2003/0144156 A1 Jul. 31, 2003

(30) Foreign Application Priority Data

Dec. 19, 2001 (JP) .................................. 2001-386249

(51) Int. Cl.⁷ ...................... C10M 141/08; F16C 33/00
(52) U.S. Cl. ...................................... 508/109; 508/100
(58) Field of Search .................................. 508/108, 109

(56) References Cited

U.S. PATENT DOCUMENTS

| | | | | |
|---|---|---|---|---|
| 4,432,883 A | * | 2/1984 | Denzine et al. ............. | 508/104 |
| 5,733,962 A | * | 3/1998 | Osako et al. ................ | 524/449 |
| 5,767,186 A | * | 6/1998 | Shimokusuzono et al. .. | 524/502 |
| 5,879,791 A | * | 3/1999 | Kato et al. ................ | 428/295.1 |
| 5,906,967 A | * | 5/1999 | Kato et al. .................. | 508/106 |
| 5,998,339 A | * | 12/1999 | Kato et al. .................. | 508/106 |

* cited by examiner

Primary Examiner—Ellen M McAvoy
(74) Attorney, Agent, or Firm—Browdy and Neimark PLLC

(57) ABSTRACT

A first sliding member of the present invention is made of a composition comprising 10–50% by weight of carbon fibers and 2–30% by weight of a thermoplastic elastomer, the balance being substantially a polyphenylene sulfide resin, at least in a sliding surface portion. A second sliding member of the present invention is made of a composition comprising 10–50% by weight of glass fibers and 2–30% by weight of a thermoplastic elastomer, the balance being substantially a polyphenylene sulfide resin, at least in a sliding surface portion.

13 Claims, 4 Drawing Sheets

100 μm

SLIDING MEMBER

FIELD OF THE INVENTION

The present invention relates to a sliding member made, at least in a sliding surface portion, of a polyphenylene sulfide resin composition excellent in wear resistance, sealability, heat resistance, chemical resistance, mechanical strength, etc., particularly to a sliding member suitably usable as an oil seal ring.

BACKGROUND OF THE INVENTION

As the performance and fuel consumption of hydraulic machines have recently been more and more improved to save energy, there has been increasingly higher demand of providing higher sealability and lower friction to oil seal rings used in rotary shafts and reciprocating parts of the hydraulic machines. Conventionally used for the oil seal rings are metals or plastics from the viewpoint of resistance to sliding heat, hydraulic pressure, oil, etc. Examples of metals used for the oil seal rings include cast iron such as FC25, etc. There are only a few examples of plastics having sufficient heat resistance and slidability, and commercially available resins that are usable for the oil seal rings are only polyetheretherketone resins (PEEK resins), tetrafluoroethylene resins (PTFE resins), polyimide resins (PI resins) or polyphenylene sulfide resins (PPS resins).

Al or Al alloys are widely used for to reduce the weight of automatic transmissions, and when these metals are used for sliding mates, on which oil seal rings slide, the oil seal rings are generally made of cast iron or PTFE resins. However, the oil seal rings made of cast iron are poor in sealability though they have excellent wear resistance. In contrast, the oil seal rings made of the PTFE resins are excellent in sealability, though they are extremely poor in wear resistance, resulting in abnormal wear of Al or its alloys in a short time.

Under such circumstances, various proposals have been made to provide sliding members excellent in wear resistance and sealability. For example, JP 55-7848 A discloses that carbon fibers and solid lubricant particles are added to a polyphenylene sulfide resin, to obtain a sliding member excellent slidability with soft (relatively low-hardness), non-ferrous metals such as Al alloys. Because the PPS resin is as good as the PTFE resin in heat resistance and the next to the PTFE resin in chemical resistance, it is suitable for the oil seal members. However, the oil seal member made only of the PPS resin is insufficient in wear resistance and slidability. Therefore, reinforcement by carbon fibers and lubrication by solid lubricant particles are given to the PPS resin, so that the PPS resin can be used for the oil seal members.

However, the above conventional, PPS resin-based sliding member is disadvantageous in poor adhesiveness between fibrous fillers such as carbon fibers and the PPS resin. Thus, the fibrous fillers are likely pulled out from a sliding surface of the member during a sliding operation, causing the plastic flow of the PPS resin. Further, the pulled-out fibrous fillers cause abrasive wearing, thereby accelerating the wear of the sliding mate. Furthermore, the oil seal ring is so difficult in assembling because of brittleness peculiar to the PPS resin, that it cannot be put into practical use without difficulty.

OBJECTIVE OF THE INVENTION

Accordingly, an objective of the present invention is to provide a sliding member using a polyphenylene sulfide resin, which is excellent in wear resistance, sealability, heat resistance, chemical resistance, mechanical strength, etc.

SUMMARY OF THE INVENTION

As a result of intense research in view of the above objective, the inventor has found that a polyphenylene sulfide resin composition comprising fibrous fillers and a thermoplastic elastomer is not only excellent in sealability, heat resistance and chemical resistance but also sufficient in wear resistance and mechanical strength, because of high adhesiveness between the fibrous fillers and the polyphenylene sulfide resin. The present invention has been completed based on this finding.

Thus, the first sliding member according to the present invention is made of a composition comprising 10–50% by weight of carbon fibers and 2–30% by weight of a thermoplastic elastomer, the balance being substantially a polyphenylene sulfide resin, at least in a sliding surface portion. In the first sliding member, it is preferable that the composition further comprises 2–20% by weight of solid lubricant particles. The first sliding member is extremely effective particularly when it is used in such applications that its sliding surface slides on a sliding mate made of a soft, non-ferrous metal material.

The second sliding member according to the present invention is made of a composition comprising 10–50% by weight of glass fibers and 2–30% by weight of a thermoplastic elastomer, the balance being substantially a polyphenylene sulfide resin, at least in a sliding surface portion. The second sliding member is extremely effective particularly when it is used in such applications that its sliding surface slides on a sliding mate made of a cast iron material.

The polyphenylene sulfide resin compositions (PPS resin compositions) for the first and second sliding members are composite materials comprising the polyphenylene sulfide resin (PPS resin) as a matrix material. The PPS resin compositions used in this invention have as high heat resistance as that of the conventional PPS resin composition disclosed in JP 55-7848 A, and have wear resistance and fracture strength remarkably exceeding those of the conventional PPS resin composition. Further, the PPS resin compositions used in the present invention have high hardness unlike a PTFE resin. Therefore, the first and second sliding members are not fractured even under a high hydraulic pressure. The PPS resin compositions have high fluidity even at a low resin temperature, which is approximately 100° C. lower than a resin temperature required to obtain a PEEK resin with high fluidity. Thus, the PPS resin compositions can be easily formed with high dimensional accuracy.

DETAILED DESCRIPTION OF THE PREFERRED EMBODIMENTS

The first and second sliding members of the present invention will be described in detail below. The first and second sliding members have essentially the same composition in their sliding surface portions except for fibrous fillers. Thus, characteristics common to both sliding members will be described first.

In the first and second sliding members, at least a sliding surface portion is composed of the PPS resin composition. The first and second sliding members except for the sliding surface portions may be composed of other materials than the PPS resin composition, such as a PTFE resin, a metal, etc, and a mixture thereof including the PPS resin. In a case where a substrate of the sliding member is made of other material than the PPS resin composition, at least part of the substrate corresponding to the sliding surface may be coated with the PPS resin composition by such a method as spraying, laminating, etc.

Figure 1:
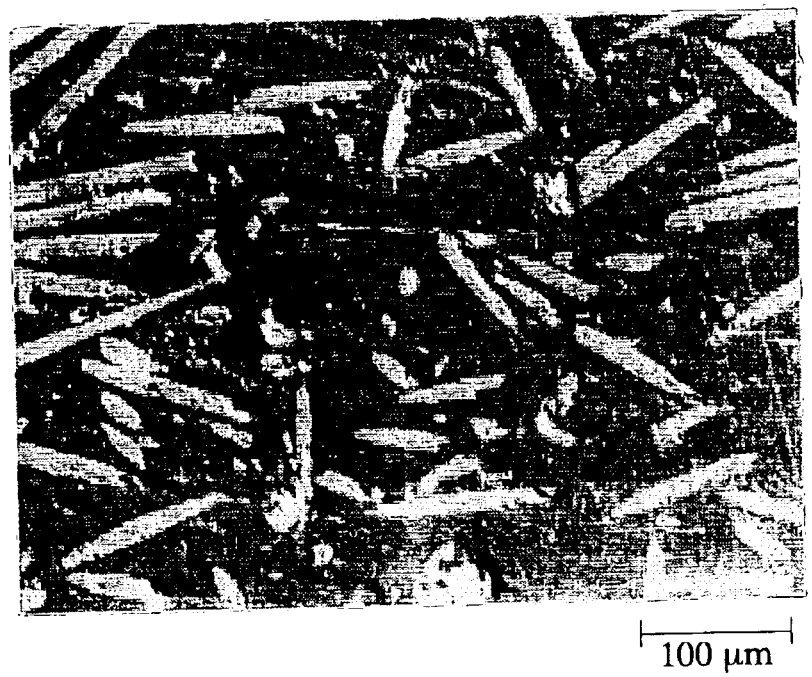
FIG. 1 is an electron photomicrograph showing a sliding surface of a sliding member according to one embodiment of the present invention.

FIG. 1 is an electron photomicrograph showing a sliding surface of a sliding member according to one embodiment of the present invention. The sliding surface of FIG. 1 has a composition comprising a PPS resin, a thermoplastic elastomer, carbon fibers and solid lubricant particles. As is clear from the electron photomicrograph, the carbon fibers (white, needle-like, fibrous fillers) and the solid lubricant particles are dispersed in a matrix material of the PPS resin, with the thermoplastic elastomer indiscernible. The thermoplastic elastomer seems to be dispersed at the molecular level.

[1] First Sliding Member

The PPS resin composition for the first sliding member comprises the carbon fibers and the thermoplastic elastomer as essential components, and may further comprise the solid lubricant particles if necessary.

(A) Carbon Fiber

The carbon fibers may be prepared by calcining or burning fibrous, organic polymers. Known carbon fibers such as those derived from polyacrylonitrile, pitch, cellulose, etc. can be used in the first sliding member. In general, high-strength carbon fibers are prepared by calcining at low temperatures, while high-elasticity carbon fibers are prepared by calcining at high temperatures. Though both types of carbon fibers may be used in this invention, the carbon fibers prepared by calcining at low temperatures are preferable to obtain the PPS resin composition with sufficient strength.

The average length of the carbon fibers is preferably 30–300 μm, more preferably 100–200 μm, and the average diameter of the carbon fibers is preferably 5–20 μm, more preferably 6–15 μm. When the average fiber length is less than 30 μm, there is no sufficient reinforcing effect by the addition of the carbon fibers. On the other hand, when the average fiber length exceeds 300 μm, it is difficult to uniformly disperse the carbon fibers in the PPS resin composition. Further, when the average fiber diameter is less than 5 μm, the carbon fibers tend to be agglomerated with each other. On the other hand, when the average fiber diameter is more than 20 μm, the first sliding member using the carbon fibers abrades a sliding mate.

A weight ratio of the carbon fibers to 100% by weight of the entire PPS resin composition is 10–50% by weight, preferably 15–25% by weight, for example, approximately 20% by weight. When the weight ratio is less than 10% by weight, there is no sufficient reinforcing effect by the addition of the carbon fibers, failing to obtain the first sliding member with sufficient strength. On the other hand, the weight ratio of more than 50% by weight turns the first sliding member brittle and frangible.

(B) Thermoplastic Elastomer

Known thermoplastic elastomers may be used in this invention as long as they can form polymer alloys with the PPS resin. For example, the thermoplastic elastomers may be olefinic elastomers, styrenic elastomers, polyester elastomers, polyvinyl chloride elastomers, urethane elastomers, polyamide elastomers, etc. Preferable among them are olefinic elastomers, styrenic elastomers and polyester elastomers.

Examples of the olefinic elastomers include polyisobutylene elastomers, ethylene-propylene copolymers, ethylene-propylene-unconjugated diene copolymers, ethylene-butene-1 copolymers, ethylene-propylene-butene-1 copolymers, ethylene-hexene-1 copolymers, ethylene-vinyl acetate copolymers, ethylene-acrylic acid copolymers, ethylene-methacrylic acid copolymers, ethylene-glycidyl acrylate copolymers, ethylene-glycidyl methacrylate copolymers, ethylene-vinyl acetate-glycidyl methacrylate copolymers, ethylene-maleic acid copolymers, ethylene-maleic anhydride copolymers, etc.

Examples of the styrenic elastomers include block copolymers of aromatic vinyl compounds and conjugated diene compounds, and hydrogenated products thereof. The aromatic vinyl compounds may be styrene, α-methylstyrene, vinyltoluene, p-t-butylstyrene, 1,1-diphenylethylene, etc. and the conjugated diene compounds may be butadiene, isoprene, 1,3-pentadiene, 2,3-dimethyl-1,3-butadiene, a combination thereof, etc.

A weight ratio of the thermoplastic elastomer to 100% by weight of the entire PPS resin composition is 2–30% by weight, preferably 4–20% by weight, for example, approximately 10% by weight. When the weight ratio is less than 2% by weight, there is no sufficient effect by the addition of the thermoplastic elastomer, resulting in insufficient adhesiveness between the PPS resin and the filler. On the other hand, when the weight ratio is more than 30% by weight, the sliding member has reduced strength, and the thermoplastic elastomer is likely to be thermally decomposed to generate gas in a compounding or forming process.

(C) Solid Lubricant Particles

The PPS resin composition for the first sliding member preferably comprises the solid lubricant particles to increase its slidability. The solid lubricant particles may be powder of graphite, molybdenum disulfide ($MoS_2$), polytetrafluoroethylene (PTFE), etc. Plural types of the solid lubricant particles may be combined. The solid lubricant particles preferably have a grain size of 325# mesh or less.

A weight ratio of the solid lubricant particles to 100% by weight of the entire PPS resin composition is preferably 2–20% by weight, more preferably 4–8% by weight, for example, approximately 5% by weight. When the weight ratio is less than 2% by weight, sufficient effects are hardly obtained by adding the solid lubricant particles. On the other hand, when the weight ratio is more than 20% by weight, the first sliding member tends to have decreased strength.

(D) Sliding Mate

The advantages of the first sliding member are most clearly noticed when it is used in such applications that its sliding surface slides on a sliding mate made of a soft, non-ferrous metal material. Particularly preferred as the soft, non-ferrous metal material are Al and Al alloys such as AC8A, and Cu alloys. The soft, non-ferrous metal material may have such low hardness as 77–80 by HRB (Rockwell hardness).

[2] Second Sliding Member

The PPS resin composition for the second sliding member comprises the glass fibers and the thermoplastic elastomer as essential components, and may further comprise the solid lubricant particles if necessary. Since the thermoplastic elastomers for the second sliding member may be the same as those for the first sliding member, description thereof will be omitted here.

(A) Glass Fibers

The average length of the glass fibers for the second sliding member is preferably 30–300 μm, more preferably 150–250 μm, and the average diameter of the glass fibers is preferably 5–20 μm, more preferably 10–20 μm. When the average fiber length is less than 30 μm, the glass fibers are less likely to sufficiently reinforce the PPS resin composition. On the other hand, the average fiber length of more than 300 μm often causes difficulties in dispersibility and workability. Further, the glass fibers with the average diameter of less than 5 μm cannot easily be produced, resulting in increase in the product cost. When the average fiber diameter is more than 20 μm, the second sliding member has an insufficient strength and abrades a sliding mate.

A weight ratio of the glass fibers to 100% by weight of the entire PPS resin composition is 10–50% by weight, preferably 30–45% by weight, for example, approximately 40% by weight. When the weight ratio is less than 10% by weight, there is no sufficient reinforcement effect by the addition of the glass fibers. On the other hand, when the weight ratio is more than 50% by weight, the second sliding member has decreased strength.

(B) Sliding Mate

The second sliding member is preferably used in such applications that its sliding surface slides on a sliding mate made of a cast iron material. Used as the cast iron material may be FC45, etc. The second sliding member is also suitable for sliding on an iron material having a relatively low hardness, and the sliding mate may be a pressed material such as SPCE with Hv (Vickers hardness) of 95–130, etc.

[3] Method for Producing Sliding Member

The first and second sliding members of the present invention may be produced by a known method where the above components are mixed in a compounding apparatus, etc. and molded. For example, the fibrous fillers (carbon fibers or glass fibers) and, if necessary, the solid lubricant particles are added to a melt-blend of the matrix material of the PPS resin and the thermoplastic elastomer, and the resulting mixture is injection-molded. The solid lubricant particles may be added at any stage as long as it is uniformly mixed with the other components. The components for the PPS resin composition may be mixed at once or stepwise.

The present invention will be explained in more detail referring to Examples below without intention of restricting the present invention thereto.

Examples 1–4 and Comparative Examples 1–5

PPS resin composition pellets were prepared from the materials shown in Table 1 by a single-screw compounding apparatus and injection-molded under the conditions of a resin temperature of 300° C. and a mold temperature of 150° C., to produce sliding members of Examples 1–4 and Comparative Examples 1–5, respectively. An injection mold used had a ring-shaped cavity with an outer diameter of 50 mm, an inner diameter of 45 mm and a depth of 2 mm. The carbon fibers used had an average length of 100 μm and an average diameter of 10–15 μm, and the glass fibers used had an average length of 200 μm and an average diameter of 15 μm. Each of the resultant ring-shaped sliding members had a 0.3-mm-wide gap. The sliding members of Examples 1–3 were particularly suitable for an Al-alloy sliding mate, and the sliding member of Example 4 was particularly suitable for a cast iron sliding mate.

TABLE 1

| No. | Composition (% by weight) |
|---|---|
| Example 1 | PPS resin + 20% carbon fibers + 10% thermoplastic elastomer |
| Example 2 | PPS resin + 20% carbon fibers + 5% MoS$_2$ + 10% thermoplastic elastomer |
| Example 3 | PPS resin + 20% carbon fibers + 5% graphite + 10% thermoplastic elastomer |
| Example 4 | PPS resin + 40% glass fibers + 10% thermoplastic elastomer |
| Com. Ex. 1 | 100% PPS resin |
| Com. Ex. 2 | PPS resin + 20% carbon fibers |
| Com. Ex. 3 | PPS resin + 40% glass fibers |
| Com. Ex. 4 | PTFE resin + 20% carbon fibers |
| Com. Ex. 5 | Cast iron (FC25) |

Each ring-shaped sliding member thus obtained, whose side surface was a sliding surface, was subjected to a sliding test to evaluate its wear resistance. Important parts of a sliding test machine used were shown in a longitudinal sectional view of FIG. 2. A test piece 5 of each ring-shaped sliding member was fixed onto a test piece holder 4 disposed on a rotor holder 1. A disk 3 of a sliding mate having a diameter of 80 mm and a thickness of 10 mm was attached to a stator holder 6. The disk 3 was made of an Al alloy of AC8A and had an oil-feeding opening 3a in a center thereof. Turbine oil heated to 90° C. as a lubricating oil was fed at a rate of 600 cc per minute to the oil-feeding opening 3a through a channel 2 of the stator holder 6.

Figure 2:
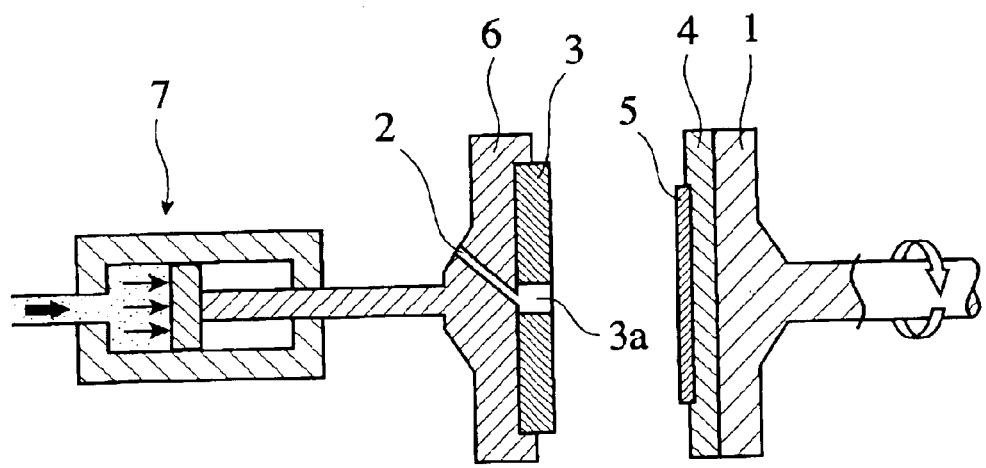
FIG. 2 is a longitudinal sectional view showing important parts of a sliding test machine used in Examples.
Figure 3:
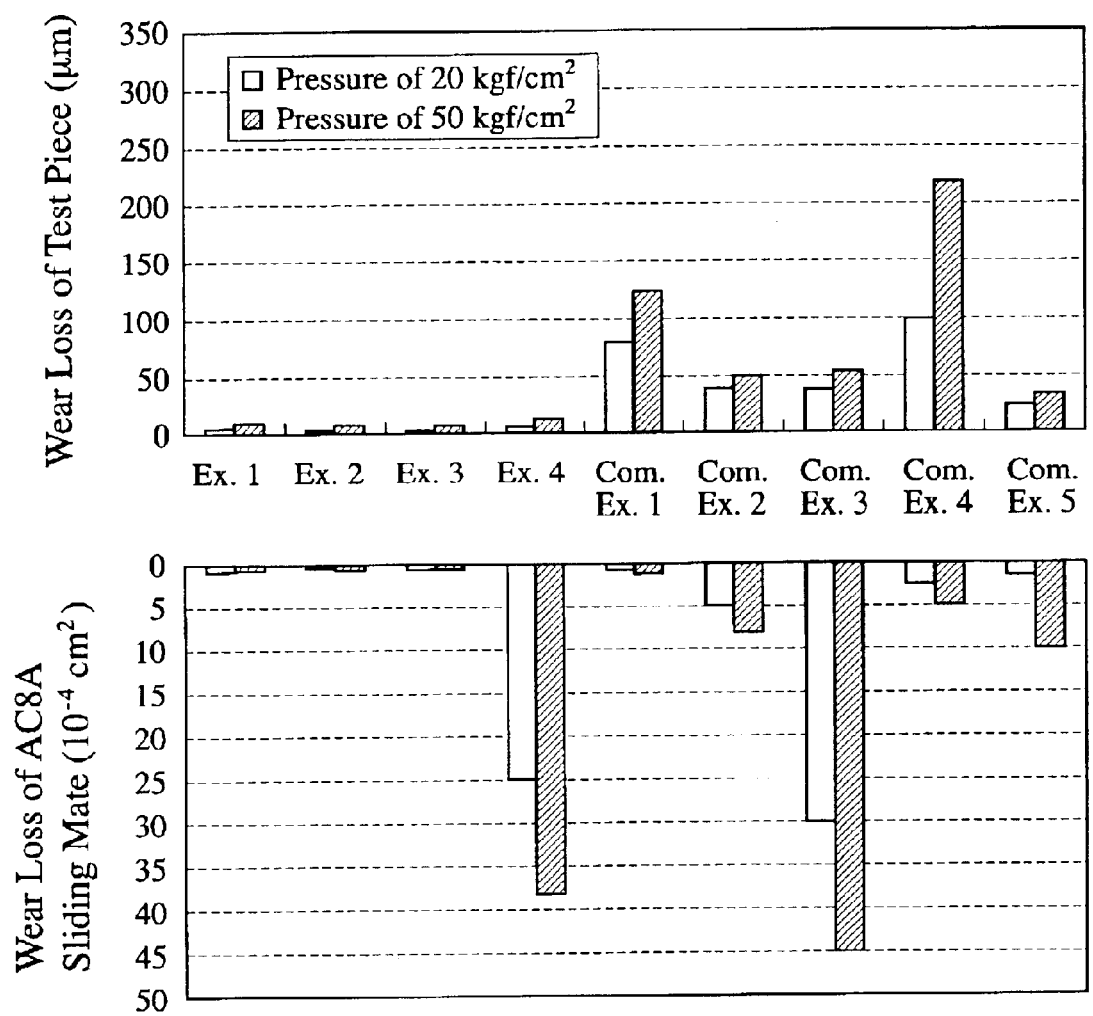
FIG. 3 is a graph showing the wear losses of test pieces and sliding mates made of an Al alloy material measured after a sliding test in Examples.

The disk 3 was brought into contact with the side surface of the test piece 5 and slid thereon while axially rotating the rotor holder 1 with a pressure of 20 or 50 kgf/cm$^2$ applied to the stator holder 6 by a hydraulic apparatus 7 in a direction shown by black arrows in FIG. 2. The peripheral speed of the test piece 5 relative to the disk 3 was 2 m/second, and the sliding distance was 22 km. After the sliding test, each test piece 5 and each sliding mate disk 3 were measured with respect to wear loss. The results are shown in FIG. 3. Incidentally, the wear loss is represented by the cross section of a dent generated on the sliding mate surface by wearing, and its unit is "cm$^2$." For instance, when the wear depth of the sliding mate is 10 μm, the wear loss of the sliding mate is calculated as 0.001 cm×0.25 cm=2.5×10$^{-4}$ cm$^2$, because the width of the ring (test piece 5) is 2.5 mm [(50−45)/2].

Further, each test piece 5 and each sliding mate disk 3 were measured with respect to wear loss in the same manner as above except for using a cast iron (FC45) in place of AC8A for the disk 3. The results are shown in FIG. 4.

To evaluate the fracture toughness of each test piece 5, the gap of each test piece 5 was radially widened and measured with respect to the maximum width of the gap. The results are shown in FIG. 5.

Figure 4:
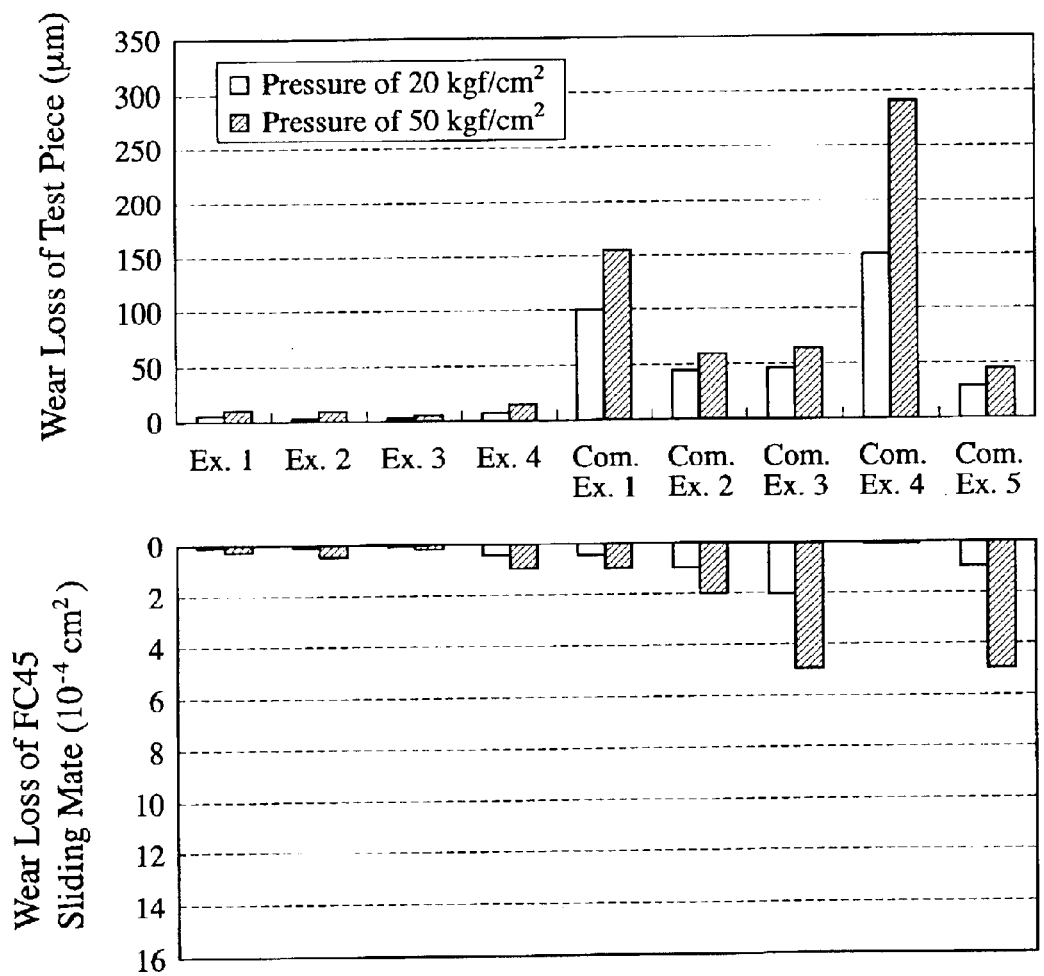
FIG. 4 is a graph showing the wear losses of test pieces and sliding mates made of a cast iron material measured after a sliding test in Examples.

As is clear from FIGS. 3 and 4, both of the sliding member and the sliding mate exhibited small wear loss in the case of the sliding members of Examples 1–3 sliding on the Al alloy (AC8A) and in the case of the sliding members of Examples 1–4 sliding on the cast iron (FC45), respectively. It has thus found that the sliding members of Examples 1–3 are suitable for sliding not only on the Al alloy but also on the cast iron. In contrast, the sliding member of Comparative Example 1 made only of the PPS resin exhibited large wear loss. This is due to the fact that the sliding member of Comparative Example 1 containing no fibrous fillers is poor in wear resistance. The sliding members of Comparative Examples 2 and 3 made only of the PPS resin and the fibrous fillers were drastically worn because the fibrous fillers were pulled out therefrom, and the separated fibrous fillers severely abraded the sliding mate. The PTFE resin-based sliding member of Comparative Example 4 and the cast iron-made sliding member of Comparative Example 5 were larger than Examples 1 to 4 in the wear loss of the sliding member and the sliding mate.

Figure 5:
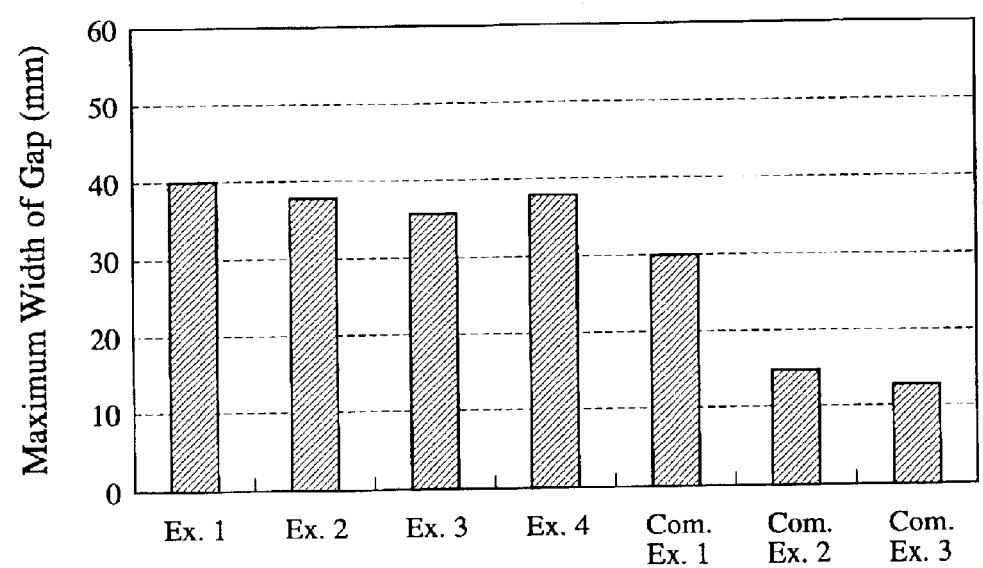
FIG. 5 is a graph showing the fracture toughness of the sliding members of Examples 1–4 and Comparative Examples 1–3.

As is clear from FIG. 5, the PPS resin compositions used in Examples 1–4 were so improved in toughness that the sliding members of Examples 1–4 were much better than those of Comparative Examples 1–3 in fracture strength. This is due to the fact that the thermoplastic elastomer improves the mechanical strength of the sliding members. Thus, the present invention has solved the problem that the PPS resin cannot be used for the oil seal rings because of its brittleness.

As described in detail above, the first and second sliding members of the present invention are excellent in wear resistance and mechanical strength, because of adhesiveness between the fibrous fillers and the PPS resin improved by the thermoplastic elastomer. In particular, the first sliding member comprising carbon fibers can be combined with most sliding mates, because it little abrades soft, non-ferrous metals having a low wear resistance, such as Al alloys.

Accordingly, the first and second sliding members of the present invention can provide seal rings having remarkably improved wear resistance and strength than those of conventional PPS resin-based seal rings as well as excellent slidability and sealability. For example, the first and second sliding members can be used as shaft seal rings of rotary machines, or as piston rings slidable with cylinders made of soft non-ferrous metals or cast iron. The first sliding member can also be used for sliding parts of oil-free compressors of Al alloys, etc.

What is claimed is:

1. A sliding member made of a composition comprising 10–50% by we ht of carbon fibers and 2–30% by weight of at least a thermoplastic elastomer selected from the group consisting of olefinic, styrenic elastomers, polyester elastomers, polyvinyl chloride elastomer, urethane elastomers and polyamide elastomers, the balance being substantially a polyphenylene sulfide resin, at least in a sliding surface portion, said olefinic elastomer being at least one selected from the group consisting of polyisobutylene elastomers, ethylene-propylene copolymers, ethylene-propylene-unconjugated diene copolymers, ethylene-butene-1 copolymers, ethylene-propylene-butene-1 copolymers, ethylene-hexene-1 copolymers, ethylene-vinyl acetate copolymers, ethylene-acrylic acid copolymers, ethylene-methacrylic acid copolymers, ethylene-glycidyl acrylate copolymers, ethylene-glycidyl methacrylate copolymers, ethylene-vinyl acetate-glycidyl methacrylate copolymers, ethylene-maleic acid copolymers and ethylene-maleic anhydride copolymers.

2. The sliding member according to claim 1, wherein said composition comprises 2–20% by weight of solid lubricant particles per 100% by weight of the entire composition.

3. The sliding member according to claim 1, wherein said sliding surface is slidable on a sliding mater made of a soft, non-ferrous metal material.

4. A sliding member made of a composition comprising 10–50% by weight of glass fibers and 2–30% by weight of at least a thermoplastic elastomer selected from the group consisting of olefinic elastomer, styrenic elastomers, polyester elastomers, polyvinyl chloride elastomer, urethane elastomers and polyamide elastomers, the balance being substantially a polyphenylene sulfide resin, at least in a sliding surface portion, said olefinic elastomer being at least one selected from the group consisting of polyisobutylene elastomers, ethylene-propylene copolymers, ethylene-propylene-unconjugated diene copolymers, ethylene-butene-1 copolymers, ethylene-propylene-butene-1 copolymers, ethylene-hexene-1 copolymers, ethylene-vinyl acetate copolymers, ethylene-acrylic acid copolymers, ethylene-methacrylic acid copolymers, ethylene-glycidyl acrylate copolymers, ethylene-glycidyl methacrylate copolymers, ethylene-vinyl acetate-glycidyl methacrylate copolymers, ethylene-maleic acid copolymers and ethylene-maleic anhydride copolymers.

5. The sliding member according to claim 4, wherein said sliding surface slides on a sliding mate made of a cast iron material.

6. The sliding member of claim 1 or 4 in the form of an oil seal ring.

7. The sliding member of claim 1 or 2, wherein said carbon fibers have an average length of 30–300 μm and average diameter of 5–20 μm.

8. The sliding member of claim 7, wherein the quantity of carbon fibers is 15–25% by weight.

9. The sliding member of claim 1 or 2, wherein the quantity of carbon fibers is 15–25% by weight.

10. The sliding member of claim 4, wherein said glass fibers have an average length of 30–300 μm and average diameter of 5–20 μm.

11. The sliding member of claim 10, wherein the quantity of glass fibers is 30–45% by weight.

12. The sliding member of claim 4, wherein the quantity of glass fibers is 30–45% by weight.

13. A sliding member made of a composition comprising substantially

10–50% by weight of carbon fibers or glass fibers and 2–30% by weight of at least one thermoplastic elastomer, the balance being substantially a polyphenylene sulfide resin, at leas in a sliding portion, said thermoplastic elastomer being blended with said polyphenylene sulfide resin so as to form an alloy with said polyphenylene sulfide resin having properties of excellent sealability, heat re& stance, chemical resistance, wear resistance and mechanical strength, and in which there is high adhesiveness between aid fibers and said alloy, said thermoplastic elastomer including at least one selected from the group consisting of polyisobutylene elastomers, ethylene-propylene copolymers, ethylene-propylene-unconjugated diene copolymers, ethylene-butene-1 copolymers, ethylene-propylene-butene-1 copolymers, ethylene-hexene-1 copolymers, ethylene-vinyl acetate copolymers, ethylene-acrylic acid copolymers ethylene-methacrylic acid copolymers, ethylene-glycidyl acrylate copolymers, ethylene-glycidyl methacrylate copolymers, ethylene-vinyl acetate-glycidyl methacrylate copolymers, ethylene-maleic acid copolymers and ethylene-maleic anhydride copolymers.

* * * * *